United States Patent Office 3,463,299
Patented Aug. 26, 1969

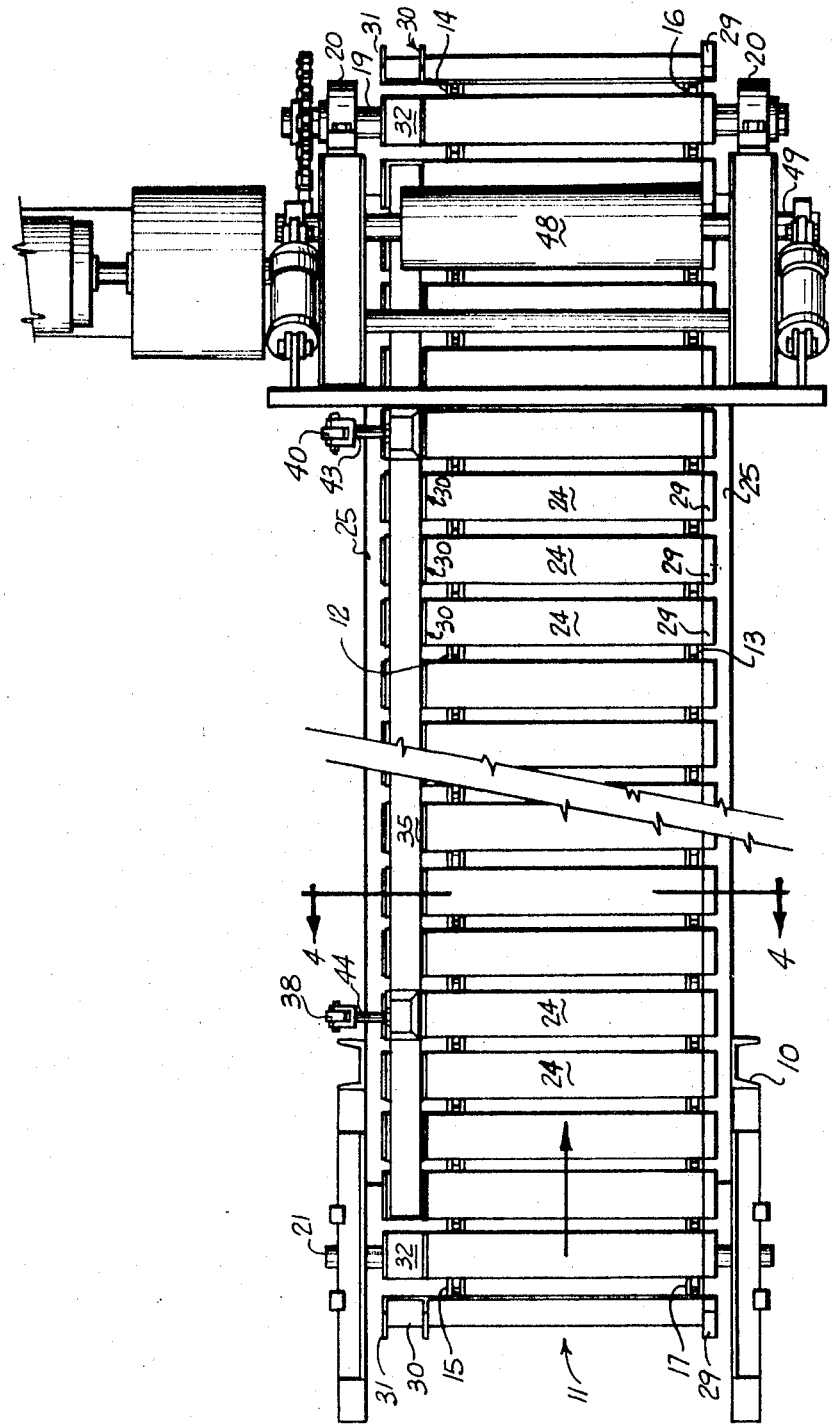

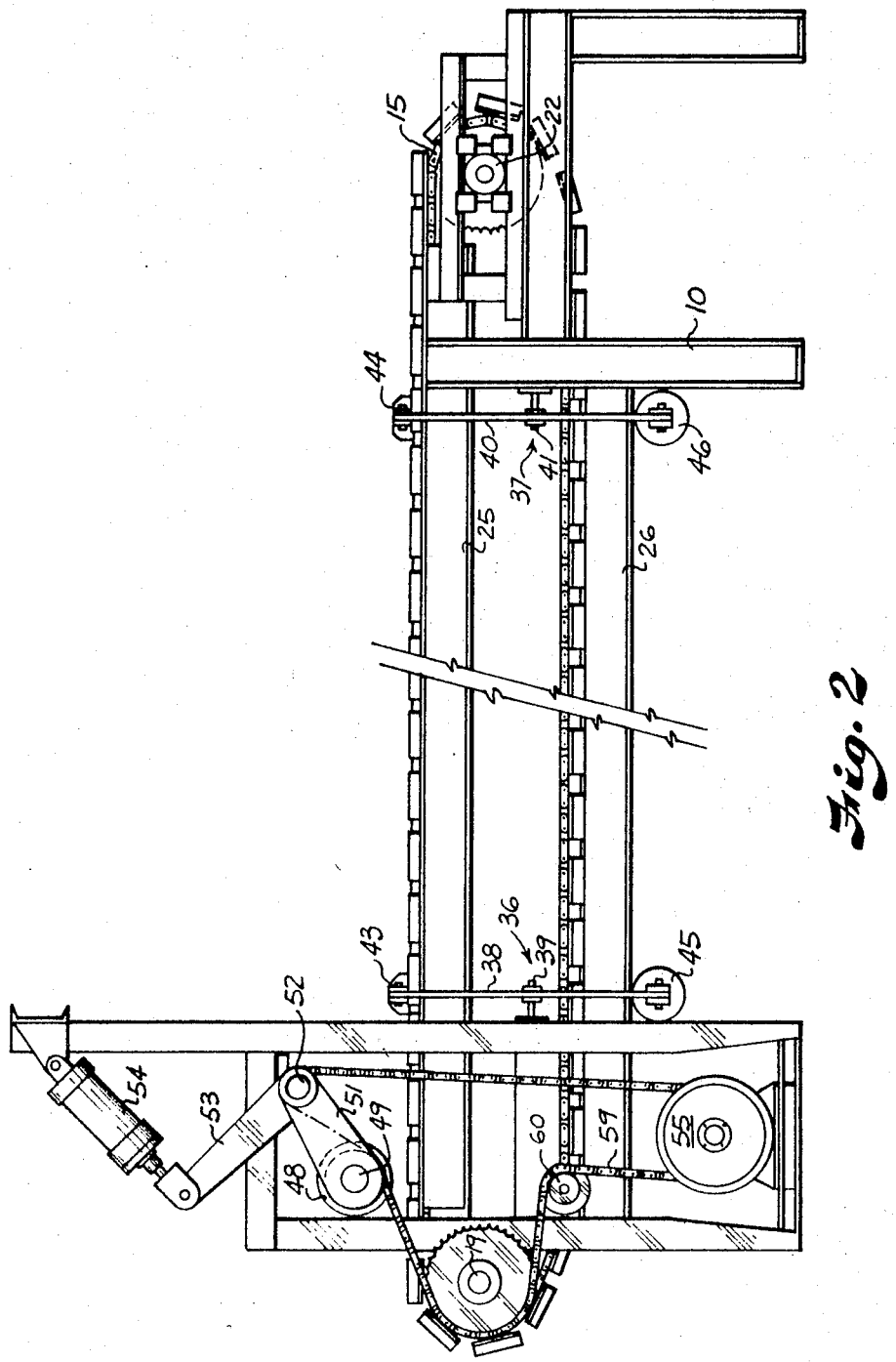

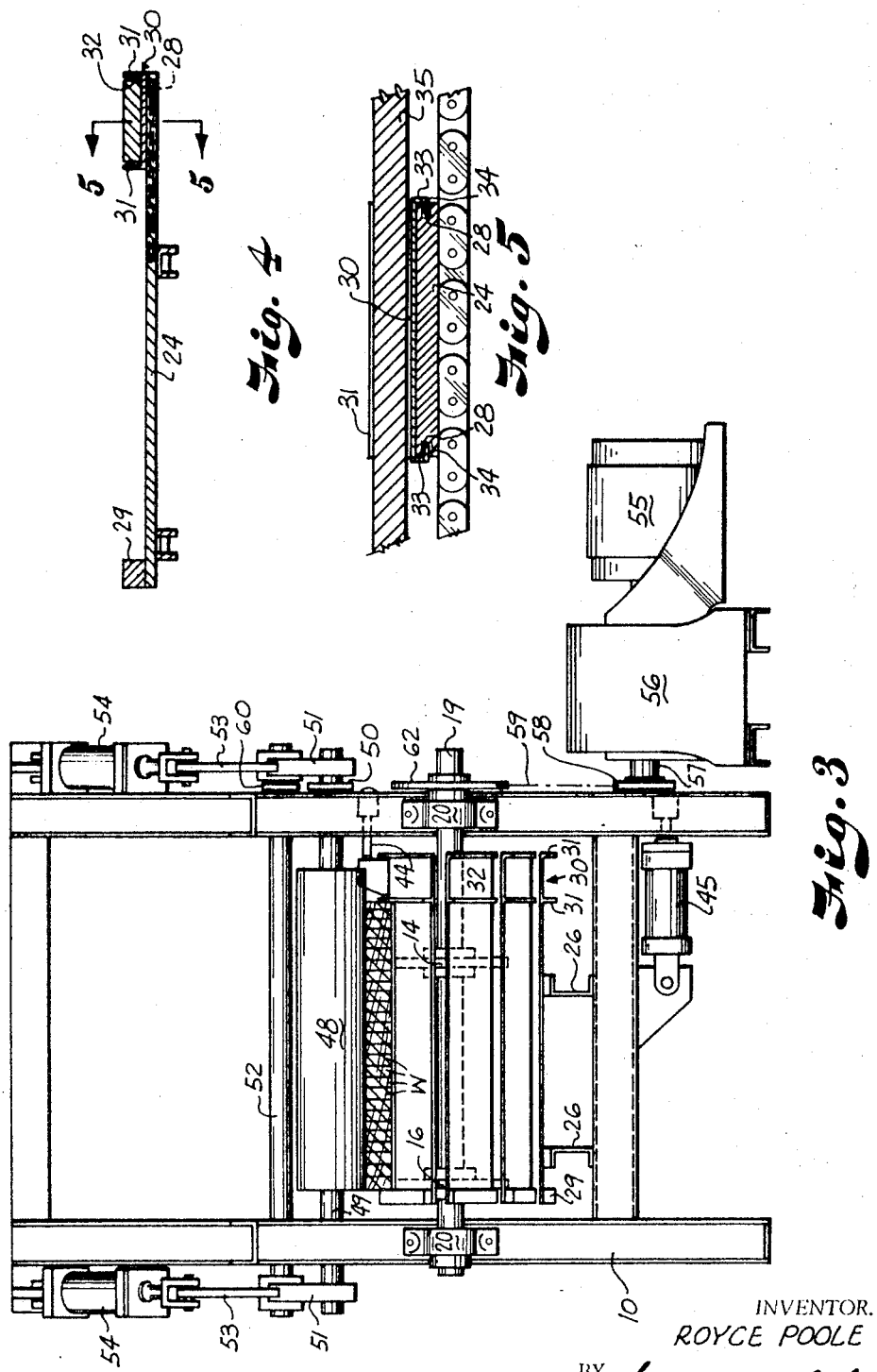

3,463,299
LAMINATING PRESS FEEDER
Royce Poole, Warren, Ark., assignor to Potlatch Forests, Inc., Lewiston, Idaho, a corporation of Delaware
Filed Mar. 3, 1967, Ser. No. 620,349
Int. Cl. B65g 15/00, 17/00, 19/00
U.S. Cl. 198—179                      4 Claims

ABSTRACT OF THE DISCLOSURE

The disclosure describes a laminating press feeder having a continuous chain conveyor with transverse slats attached to the chains. A stationary clamping member is affixed to one end of each of the slats and a movable clamping member is slidably mounted to the other end of each slat. The movable clamping members have wide grooves formed therein for receiving a pusher bar. The pusher bar moves the upper flight of movable clamping members toward the stationary members to clamp the lamina therebetween.

BACKGROUND OF THE INVENTION

The present invention relates to an assembling and conveying apparatus and more particularly to a feeder for assembling laminated wood products and conveying the assembled products to a press for curing under pressure or heat or both.

It has been common practice in the wood products industry to manufacture laminated wood products by gluing or otherwise fastening together a plurality of boards in facing or side by side relationship. It has been found that laminated wood products such as laminated beams posses certain qualities that are superior to structural steel.

In order to insure proper lamination of the wood beams, it is necessary that component boards be properly aligned and positioned when fed to the laminating press for curing. This necessitates some sort of work holder be used to hold the boards in the proper alignment as a composite structure is fed to the press.

It has been common practice to use a plurality of separate manually operative clamping work holders in the assembling process of manufacturing laminated wooden beams. Other devices have been constructed to keep an assembled beam under transverse pressure while being conveyed to a curing press. Such devices have included side pressure rollers for transmitting the assembled beam to a press while maintaining the assembled beam under transverse pressure. This however has proven unsatisfactory since the rollers tend to crush and deform the outermost boards of the beam as the beam is advanced to the press. U.S. Letters Patent No. 2,684,149 discloses a feeder in which the assembled beam is longitudinally positioned between moving flexible conveyor chains. One of the chains is laterally biased by several longitudinally spaced vertical rollers that are laterally adjustable to press the individual boards together. Such a feeder requires that the longitudinal position of the rollers be manually changed each time a beam of a different width is to be assembled. Also such a feeder applies a progressively increased transverse pressure to the assembled beam as the boards are fed to the feeder instead of applying a uniform transverse pressure to the entire assembled beam.

OBJECTS AND SUMMARY OF THE INVENTION

One of the principal objects of this invention is to provide a feeder that is efficient in operation, simple in construction, and economical to manufacture.

An additional object of this invention is to provide a novel feeder in which there are a plurality of individual clamping means that apply uniform transverse pressure to the assembled beam as the beam is being conveyed to a laminating press.

A further object of my invention is to provide individual clamping means that are longitudinally movable in clamping engagement with the beam and which are automatically progressively released as the assembled beam is advanced to the laminating press.

An additional object of my invention is to provide a feeder in which the means may be readily assembled between the clamping means.

With these and other objects in mind my invention concerns a laminating press feeder having a base frame with a continuous conveyor mounted thereon. The conveyor includes a plurality of transverse slats that are mounted on spaced conveyor chains for receiving the boards on the upper flight thereof. A stationary clamping member is affixed to one end of each slat and a movable clamping member is slidably mounted on the other end of each slat. A pressing mechanism slidably engages the movable clamping members on the upper flight of the conveyor for moving the engaged clamping members to clamp the glued boards together to form an assembled beam. More particularly, each of the clamping members has a longitudinal groove formed therein for slidably receiving a longitudinal pushing bar of the pressing mechanism.

BRIEF DESCRIPTION OF THE DRAWINGS

A preferred embodiment of my invention is illustrated in the accompanying drawings, in which:

FIG. 1 is a plan view of a laminating press feeder showing the principal elements of this invention;

FIG. 2 is a side elevation view of the feeder;

FIG. 3 is a rear elevation view of the feeder showing an assembled beam;

FIG. 4 is a fragmentary view taken on line 4—4 in FIG. 1; and

FIG. 5 is a fragmentary view taken on line 5—5 in FIG. 4.

DESCRIPTION OF THE PREFERRED EMBODIMENT

The preferred embodiment of this invention as illustrated in the accompanying drawings shows a laminating press feeder having a main frame 10. A conveyor 11 is mounted on the base frame 10 for moving an assembled beam comprising a plurality of individual boards W. The conveyor 11 has two chains 12 and 13 that are laterally spaced from the longitudinal axis of the feeder. Chain 12 is mounted between sprockets 14 and 15. Chain 13 is mounted between sprockets 16 and 17. The drive sprockets 14 and 16 are mounted on a drive shaft 19 that is supported by rear bearing brackets 20 that are affixed to the rear of the base frame 10. The idler sprockets 15 and 17 are mounted on the idler shaft 21 that is rotatably supported in front bearing brackets 22 affixed to the front of the frame 10.

The conveyor 11 also includes a plurality of slats 24 that are transversely mounted to the chains 12 and 13. The upper flight of the conveyor 11 is slidably supported on horizontal frame members 25 to form a level platform for receiving the individual boards that are used in forming an assembled beam. The lower flight of the conveyor 11 is slidably supported on horizontal frame members 26 (FIG. 2).

As may be particularly seen in FIG. 5 each of the slats 24 has side grooves 28 formed in the sides thereof that extend from one end of the slat toward the center of the slat. Each of the slats 24 has a stationary clamping member or stop 29 mounted on one end thereof. A movable clamping member 30 is slidably mounted on the other end of each slat 24. As may be seen in FIG. 4, the movable clamping member 30 has opposing sides 31 that extend upwardly to form a wide U-shaped groove 32 that is parallel with the longitudinal axis of the feeder and the path of the conveyor 11. The other opposing sides 33 (FIG. 5) of the movable clamping member 30 extend downwardly about the sides of the slat 24 with the ends 34 of the sides 33 projecting into the grooves 28. Thus each movable clamping member 30 may slide independently in the slat grooves 28 transverse to the path of the conveyor 11.

A pressing mechanism slidably engages the upper flight of movable clamping members 30 to move such clamping members 30 to and from the stationary clamping members 29 to clamp and release the assembled beams. The pressing mechanism comprises an elongated pusher bar 35 that extends substantially the distance of the upper flight of the conveyor 11 and is slidably mounted in the wide grooves 32 of the upper flight of movable clamping members 30. As the conveyor 11 moves, the clamping members 30 slide underneath the pusher bar 35. Longitudinally spaced linkage systems 36 and 37 (FIG. 2) are connected to the pusher bar 35 for moving the bar laterally with respect to the conveyor 11 to clamp the assembled beam between the clamping members 29 and 30. The linkage system 36 includes an arm 38 that is pivotally mounted on a shaft 39 that is supported on an upright of the base frame 10. The linkage system 37 comprises an arm 40 that is pivotally mounted on a shaft 41 that is supported on an upright of the base frame 10. A push rod 43 is connected to the upper end of the arm 38 and extends to the pusher bar 35. A push rod 44 is connected to the upper end of arm 40 and extends to the pusher bar 35 longitudinally spaced from the push rod 43. The lower end of the arm 38 is connected to a hydraulic cylinder 45 that is mounted on the base frame 10. The lower end of the arm 40 is connected to a hydraulic cylinder 46 that is also mounted on the base frame 10.

A hold down roller 48 (FIG. 3) is rotatably mounted transverse to and above the conveyor 11 for pressing the assembled beam between the roller and the conveyor 11. The hold down roller 48 is affixed to a rotatable shaft 49 that has a chain sprocket 50 affixed to one end thereof. The shaft 49 is supported on the end of the levers 51 that are pivotable about a shaft 52 that is rotatably supported on uprights of the frame 10. Pivot arms 53 are affixed to the shaft 52 at approximately right angles to the levers 51. The ends of the arms 53 are attached to hydraulic cylinders 54 that are secured to uprights of the base frame 10.

The conveyor 11 and hold down roller 48 are driven by a drive system that includes a motor 55. The motor 55 is connected to a gear reduction box 56 that has an output shaft 57. A drive sprocket 58 is mounted on the shaft 57 for rotating a continuous chain 59 that extends between the drive sprocket 58 and an idler sprocket 60 on shaft 52. The tension of the chain 59 is adjusted by a tension sprocket 61 (FIG. 2) that is adjustably mounted onto the base frame 10. The chain 59 engages a sprocket 62 that is affixed to the end of the shaft 19 for moving the conveyor 11. The chain 59 engages the sprocket 50 mounted on the shaft 49 for rotating the hold down roller 48.

In operation individual lamina or boards W having glued faces are positioned longitudinally on the upper flight of the conveyor 11 in facing relationship between the stationary clamp members 29 and the movable clamp members 30. When the desired number of lamina are positioned upon the slats 24 to form the desired beam width, the operator activates the hydraulic cylinders 45 and 46 and the hydraulic cylinders 54. The hydraulic cylinders 45 and 46 pivot the arms 38 and 40 about their respective shafts 39 and 41 to extend the push rods 43 and 44 to laterally move the pusher bar 35. The pusher bar 35 moves the upper flight of movable clamp members 30 against the boards to clamp the boards together to form an assembled beam. The hydraulic cylinders 54 pivot the levers 51 about the shaft 52 to move the hold down roller 48 into engagement with the upper surface of the board W to horizontally align the boards.

After the individual lamina are clamped into an assembled beam the operator activates the motor 55. The motor 55 drives the chain 59 to move the conveyor 11 and rotate the hold down roller 48 to convey the assembled beam from the feeder to a press for curing the laminated beam. As the assembled beam is advanced the clamping members 29 and 30 move with the beam.

As the conveyor moves, the clamping members engaging the laminated beam move the laminated beam forward toward the front end of the conveyor to the press. The movable clamping members engaging the laminated beam, slide along the pusher bar 35 while maintaining clamping pressure on the beam. When the clamping members 29 and 30 reach the front end of the conveyor, they begin to move from the upper flight to the lower flight. As each movable clamping member rounds the drive sprocket 14 is slidably disengages from the end of the pusher bar as shown in FIG. 3 thereby releasing the clamping pressure to enable the clamping members 29 and 30 to readily slidably disengage from the beam while the successive clamping members in the upper flight remain in clamping engagement with the assembled beam. In this manner, each pair of clamping members 29 and 30 is progressively released from clamping the beam as they move from the upper flight to the lower flight around the sprockets 14 and 16. This enables clamping pressure to be maintained on the beam until the last pair of clamping members engages the beam around the forward end of the conveyor.

What is claimed is:

1. A laminating press feeder for securing a plurality of lamina together and for longitudinally conveying the laminae forward, said press feeder comprising:
 (a) a base frame;
 (b) a continuous conveyor movably mounted on the frame having an upper flight for receiving the laminae and conveying the laminae forward to a front end thereof, said conveyor including:
  (1) a plurality of transverse slats;
  (2) a stationary clamping member fixed to one end of each slat; and
  (3) a movable clamping member slidably mounted on the other end of each slat for movement toward the stationary clamping member on the one end thereof;
 (c) a laterally movable pusher bar mounted on the frame slidably engaging the movable clamping members on the upper flight for moving said engaged clamping members uniformly toward the corresponding clamping members and for permitting the movable clamping members engaged thereby to slidably move therealong;
 (d) a first drive means operatively connected to the pusher bar for laterally moving the bar to uniformly move the movable clamping members on the upper flight toward the corresponding stationary members to grasp the laminae therebetween; and
 (e) a second drive means operatively connected to the continuous conveyor for moving the upper flight clamping members to longitudinally convey the laminae along the upper flight toward the front end of the conveyor with the movable clamping members sliding along the pusher bar and to progressively move the clamping members from the upper flight at the front end of the conveyor to sequentially slidably disengage the movable clamping members from the pusher bar and sequentially disengage the clamping members from the laminae to progressively release the laminae at the front end of the conveyor.

2. The feeder as defined in claim 1 wherein each of the movable clamping members has a groove formed therein parallel to the path of the conveyor, and wherein further the pusher bar is slidably positioned in the grooves of the movable clamping members on the upper conveyor flight for moving the engaged clamping members toward the corresponding stationary clamping members to secure the laminae therebetween.

3. The feeder as defined in claim 1 wherein the first drive means includes a pair of spaced linkages connected to the bar for moving the bar laterally to the path of the conveyor.

4. The feeder as defined in claim 1 further comprising a hold down roller transversely mounted to the frame above the conveyor for horizontally aligning the laminae on the conveyor.

References Cited

UNITED STATES PATENTS

| 2,684,149 | 7/1954 | Winkel | 198—162 |
| 3,098,514 | 7/1963 | Rados et al. | 144—281 |
| 3,191,522 | 6/1965 | Drake et al. | 100—152 X |

FOREIGN PATENTS 827,723   1/1952   Germany.

BILLY J. WILHITE, Primary Examiner

U.S. Cl. X.R.

100—151, 215; 144—281; 198—167